US008219604B2

(12) United States Patent
Carlough et al.

(10) Patent No.: US 8,219,604 B2
(45) Date of Patent: *Jul. 10, 2012

(54) SYSTEM AND METHOD FOR PROVIDING A DOUBLE ADDER FOR DECIMAL FLOATING POINT OPERATIONS

(75) Inventors: Steven R. Carlough, Poughkeepsie, NY (US); Wilhelm E. Haller, Remshalden (DE); Wen H. Li, Poughkeepsie, NY (US); Eric M. Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 808 days.

This patent is subject to a terminal disclaimer.

(21) Appl. No.: 12/348,579

(22) Filed: Jan. 5, 2009

(65) Prior Publication Data
US 2009/0112960 A1   Apr. 30, 2009

Related U.S. Application Data

(63) Continuation of application No. 11/054,687, filed on Feb. 9, 2005, now Pat. No. 7,475,104.

(51) Int. Cl.
*G06F 7/485* (2006.01)
(52) U.S. Cl. ....................................................... 708/505
(58) Field of Classification Search ................... None
See application file for complete search history.

(56) References Cited

U.S. PATENT DOCUMENTS

| 3,629,565 A | 12/1971 | Schmookler |
| 3,644,724 A | 2/1972 | Angelov et al. |
| 4,615,016 A | 9/1986 | Bradley et al. |
| 4,677,583 A | 6/1987 | Ohtsuki et al. |
| 4,745,569 A | 5/1988 | Yamaoka et al. |
| 5,146,421 A | 9/1992 | Adiletta et al. |
| 5,307,375 A | 4/1994 | Wu et al. |
| 5,444,646 A | 8/1995 | Covey |
| 6,282,556 B1 | 8/2001 | Chehrazi et al. |
| 6,292,819 B1 | 9/2001 | Bultmann et al. |
| 6,735,612 B1 | 5/2004 | Kobayashi et al. |
| 7,225,218 B2 | 5/2007 | Wang |
| 2003/0055859 A1 | 3/2003 | Seidel et al. |
| 2003/0088602 A1 | 5/2003 | Dutta et al. |

*Primary Examiner* — David H Malzahn
(74) *Attorney, Agent, or Firm* — Cantor Colburn LLP

(57) ABSTRACT

A method for implementing an adder including receiving a first and second operand. A sum of one or more corresponding digits from the first operand and the second operand is calculated. The calculating is performed by a plurality of adder blocks. Output from the calculating includes the sum of the corresponding digits and a carry out indicator for the corresponding digits. The sums of the corresponding digits and the carry out indicators in a carry chain are stored in an intermediate result register. Each of the sums in the intermediate result register is incremented by one. A selection between each of the sums and the sums incremented by one is performed. Input to the selecting includes the carry chain, and the output from the selecting includes a final sum of the first operand and the second operand. The final sum is stored in an output register.

7 Claims, 2 Drawing Sheets

SYSTEM AND METHOD FOR PROVIDING A DOUBLE ADDER FOR DECIMAL FLOATING POINT OPERATIONS

CROSS-REFERENCE TO RELATED APPLICATIONS

This application is a continuation of U.S. patent application Ser. No. 11/054,687, filed Feb. 9, 2005, the contents of which are incorporated by reference herein in their entirety.

TRADEMARKS

IBM® is a registered trademark of International Business Machines Corporation, Armonk, N.Y., U.S.A. S/390, Z900 and z990 and other names used herein may be registered trademarks, trademarks or product names of International Business Machines Corporation or other companies.

BACKGROUND OF THE INVENTION

This invention relates generally to decimal floating point arithmetic, and more particularly, to the design and implementation of a wide decimal adder for computing the coefficient results for decimal floating point operands.

Several techniques of designing adder units for performing high speed additions of decimal operands consisting of a plurality of decimal digits are disclosed by Schmookler and Weinberger in "High Speed Decimal Addition", IEEE Transactions on Computers, Volume 20, No. 8, August 1971, pages 862-866. These techniques provide a direct production of decimal sums without the need of first producing the binary sums, and they avoid the decimal correction of the result in an additional operation cycle by adding six to each sum digit where a carry is produced. The techniques use carry generate and propagate functions for the decimal digits to perform a carry look ahead function over the digit positions and for the direct production of the decimal sum digits.

A combined binary/decimal adder unit using a carry look ahead logic through a plurality of decimal digit positions and a direct production of the decimal sum digits is disclosed in U.S. Pat. No. 5,928,316 to Haller et al., of common assignment herewith. The unit pre-sums are generated for each decimal position in parallel to the generation and distribution of the carries over the total of decimal digit positions of the adder unit. The pre-sums anticipate the carry-in of the decimal positions and the need to perform plus six corrections after the carry-out signal of the highest decimal digit position has been generated. The carry-out signal of each decimal digit position is used in combination with operation control signals to select the correct pre-sum of the digit position.

As the speed of microprocessors continues to increase, the amount of computation that can be done in a single cycle decreases. For decimal floating point operations implemented in computer systems with aggressive cycle times, the carry chain required for a wide adder prevents the full addition from being computed in a single cycle. Because it cannot be completed in single cycle, the wide adder may limit the performance of the rest of the computer system. It would be desirable to be able to implement a wide adder that does not limit the performance of the rest of the computer system.

BRIEF SUMMARY OF THE INVENTION

Additional features and advantages are realized through the techniques of the present invention. Other embodiments and aspects of the invention are described in detail herein and are considered a part of the claimed invention. For a better understanding of the invention with advantages and features, refer to the description and to the drawings.

An exemplary embodiment of the present invention includes a method for implementing a decimal floating point adder. The method includes receiving a first operand at a first input register and receiving a second operand at a second input register. A sum of one or more corresponding digits from the first operand and the second operand is calculated. The calculating is performed by a plurality of adder blocks during a first clock cycle. Output from the calculating includes the sum of the corresponding digits and a carry out indicator for the corresponding digits. The sums of the corresponding digits and the carry out indicators in a carry chain are stored in an intermediate result register during the first clock cycle. Each of the sums in the intermediate result register is incremented by one during a second clock cycle. A selection between each of the sums and the sums incremented by one is performed. Input to the selecting includes the carry chain, the selecting occurs during the second clock cycle, and the output from the selecting includes a final sum of the first operand and the second operand. The final sum is stored in an output register.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE PREFERRED EMBODIMENTS

Exemplary embodiments of the present invention include a wide adder that may be utilized as either two parallel 18 digit decimal adders or one 36 digit decimal adder. The wide adder completes a full addition in two pipeline cycles. The two steps of computations described herein may occur during different microprocessor cycles, thereby preventing the wide adder from limiting the performance of the rest of the computer system. Exemplary embodiments of the present invention include an adder that is designed for computing addition and subtraction operations on the coefficients of the operands described in the IEEE 754-R floating point standard. Note that the standard details a doubleword format which has a 16 digit coefficient and a quadword format that has a 34 digit coefficient. It is well known that to get a correctly rounded P digit sum from a floating point addition that the adder is required to be at least P+2 digits wide, to maintain a guard and round digit. The adder is capable of performing either 36 digit decimal addition, 36 digit decimal subtraction, 64 bit binary addition, or any combination of any of the two following operations: 18-digit decimal addition and 18 digit decimal subtraction.

Figure 1:
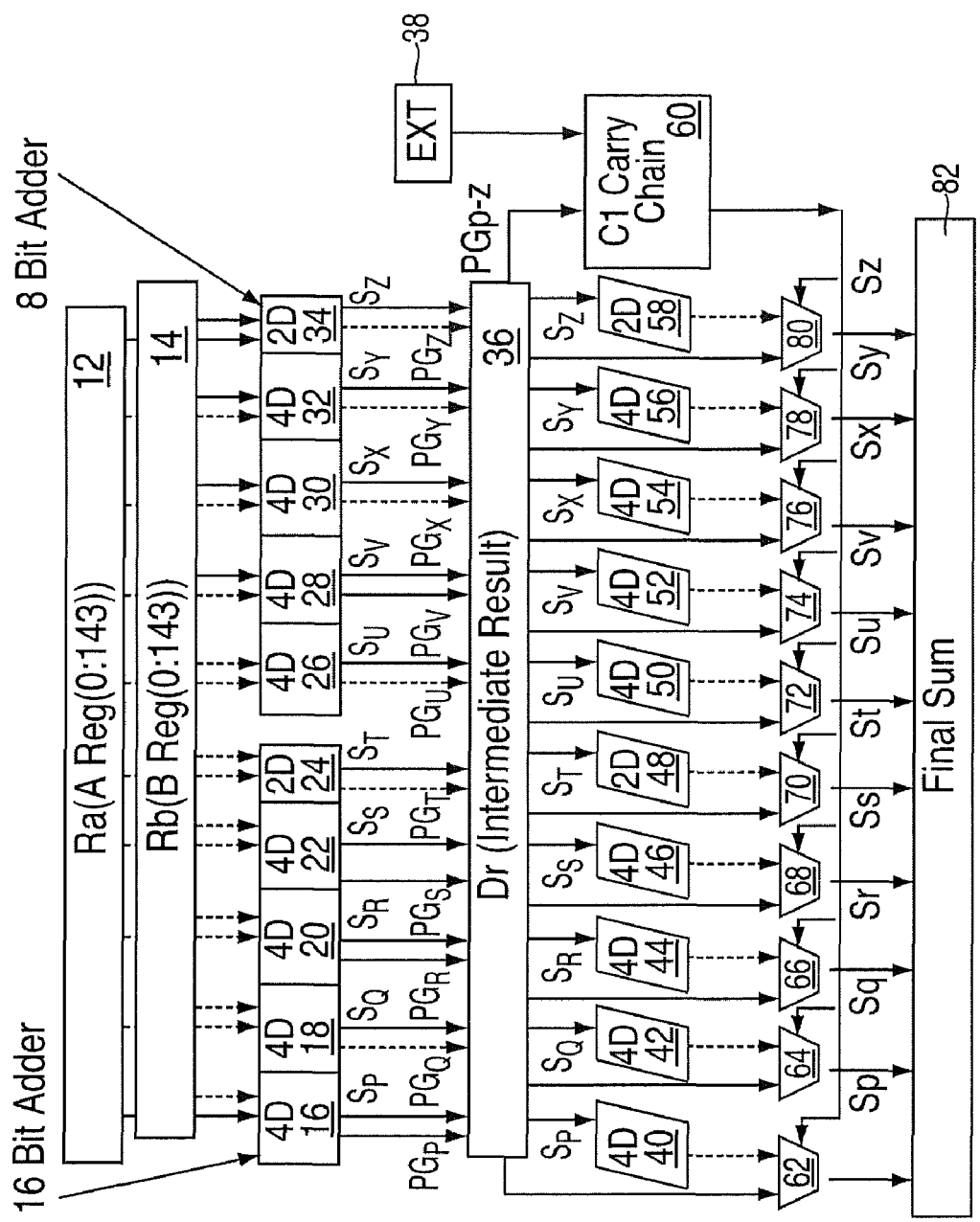
FIG. 1 is a block diagram of an exemplary pipelined adder that may be utilized by exemplary embodiments of the present invention.

FIG. 1 is a block diagram of an exemplary decimal floating point pipelined adder that may be utilized by exemplary embodiments of the present invention. The decimal floating point adder illustrated in FIG. 1 may be configured as a single 36 digit decimal adder utilized for computing decimal floating point extended precision arithmetic operations. Alternatively, it may be configured as two 18 digit decimal adders utilized for computing decimal floating point double precision arithmetic operations. Additionally, it may be configured as a binary adder. Details of the decimal floating point formats can be found in the IEEE 754-R floating point standard. The operations available in the exemplary adder structure include decimal addition of 36 binary coded decimal (BCD) digits, decimal addition of 18 BCD digits, decimal subtraction of 36 BCD digits, decimal subtraction of 18 BCD digits, binary addition of 64 bits, or binary subtraction of 64 bits. The execution of these operations is separated into two steps, each of which may be processed in separate pipeline cycles in a microprocessor.

Exemplary embodiments of the adder are structured into a high 18 digit side and a low 18 digit side. Each of the 18 digits is further partitioned into four 4 digit adder blocks and one 2 digit adder block. When the adder is configured as two 18 digit adders, the two 16 digit operands are processed in the 4 digit adder blocks and the 2 digit adder block provides processing for the guard and round bits. When the adder is configured for 36 digits, the least significant two digit adder processes the guard and round digits and the remaining adder blocks process the 34 digit operands.

FIG. 1 includes a 144 bit first register 12 and a 144 bit second register 14 for storing the operands being input to the addition. The first register 12 contains operand A and the second register 14 contains operand B. During the first step of the two cycle add, four digit intermediate results are computed based on 4 digits of operand A and 4 digits of operand B for each of the 4 digit adder blocks. The 4 digit adder blocks in the high digit side include 4 digit adder block 16, 4 digit adder block 18, 4 digit adder block 20, and 4 digit adder block 22. The 4 digit adder blocks in the low digit side include four digit adder block 26, 4 digit adder block 28, 4 digit adder block 30, and 4 digit adder block 32. Two digit intermediate results are computed based on two digits of operand A and two digits of operand B for each of the 2 digit adder blocks (i.e., 2 digit adder block 24 in the high digit side and 2 digit adder block 34 in the low digit side). In addition, the carry propagate and carry generate terms (i.e, $PG_P$, $PG_Q$, $PG_R$, $PG_S$, $PG_T$, $PG_U$, $PG_V$, $PG_X$, $PG_Y$, and $PG_Z$) for a carry look-ahead tree are also computed and stored in a carry chain 60. The sum digits (i.e., $S_P$, $S_Q$, $S_R$, $S_S$, $S_T$, $S_U$, $S_V$, $S_X$, $S_Y$, $S_Z$), carry propagate and carry generate information form the intermediate results 36 which may be implemented as a latch. A control input called EXT 38 is utilized to determine if the carry chain 60 is configured such that the adder realizes a single 36 digit adder, or if the adder realizes two separate 18 digit adders.

During the second cycle depicted in FIG. 1, the intermediate results from the first cycle are sent to incrementers (i.e., incrementer 40, incrementer 42, incrementer 44, incrementer 46, incrementer 48, incrementer 50, incrementer 52, incrementer 54, incrementer 56, and incrementer 58) and multiplexers (i.e., multiplexer 62, multiplexer 64, multiplexer 66, multiplexer 68, multiplexer 70, multiplexer 72, multiplexer 74, multiplexer 76, multiplexer 78, and multiplexer 80). The propagate and generate terms computed in the first cycle and stored in the carry chain 60 are input to the multiplexers and utilized to determine if the multiplexer output should contain the intermediate result computed in the first cycle or the incremented intermediate result computed in the second cycle. This determination is based on whether a carry in value of one is indicated in the carry chain 60. The result is the final sum 82 which may be stored in an output register.

Figure 2:
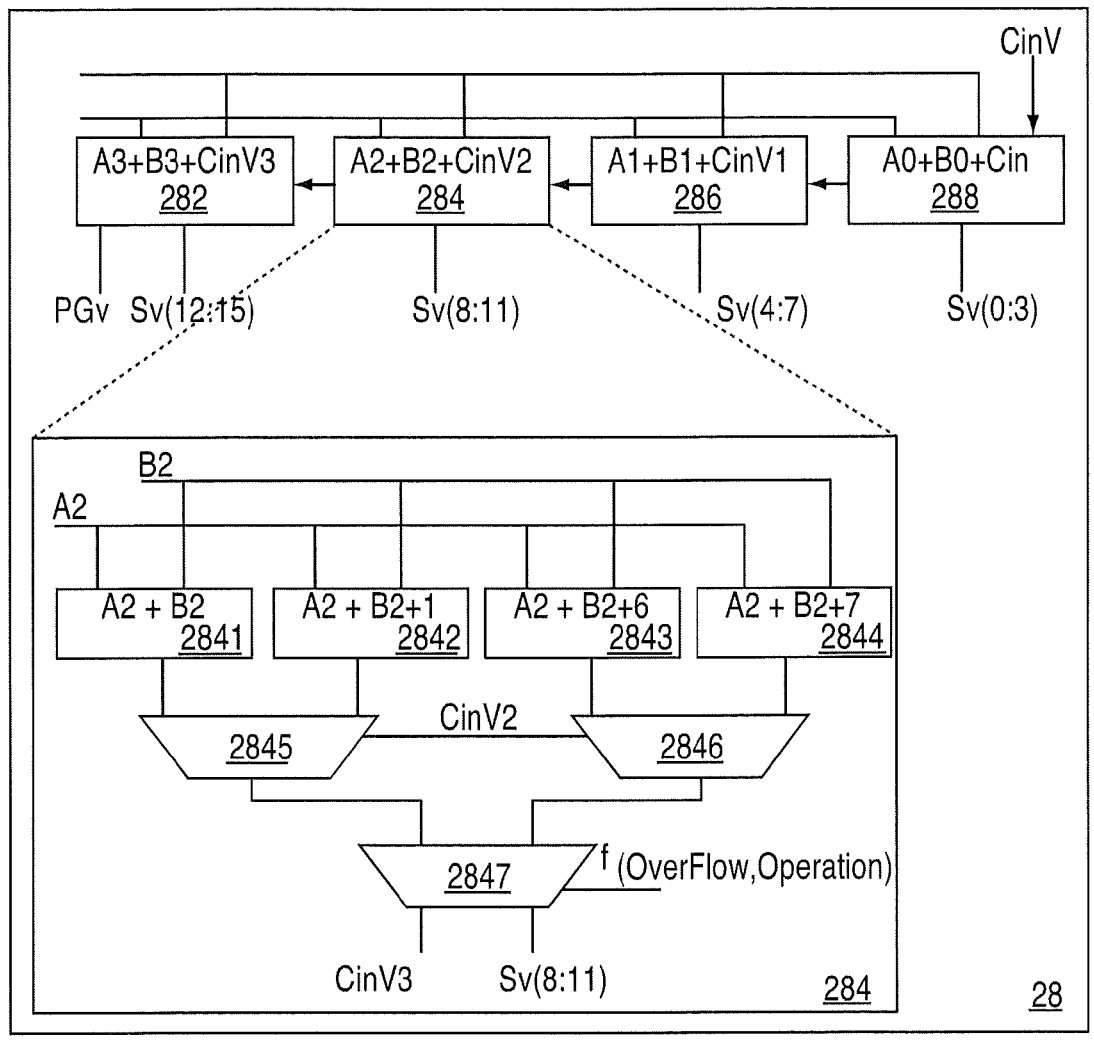
FIG. 2 illustrates one example of an adder block that may be utilized by exemplary embodiments of the present invention.

FIG. 2 illustrates an example of a 4 digit adder block that may be utilized by exemplary embodiments of the present invention. The 4 digit adder block depicted in FIG. 2 corresponds to 4 digit adder block 28 in FIG. 1 (exemplary embodiments of the other adder blocks in FIG. 1 operate in a similar fashion). The 4 digit adder block 28 receives as its input four digits of operand A and operand B as previously described. One decimal digit is sent to each of the four function blocks (i.e., function block 282, function block 284, function block 286 and function block 288) where the addition process occurs. The least significant function block 288 receives an additional input, CinV, which is the carry in to the 4 digit adder block 28 from the 4 digit adder block 30 in FIG. 1 Each function block in the 4 digit adder block 28 then generates four of the digit sums $S_Y(8:11)$ and a carry out (e.g., CinV1, CinV2 and CinV3) which is utilized by the next functional block to the left. The most significant function block 282 generates a carry out called PGv which is input to the carry chain 60 in FIG. 1. Note that there are several options here of which carries are handled in cycle 1 to reduce the critical timing path in cycle 2. In option 1, the least significant function block 288 assumes the CinV equal to zero, and this delays the carry into the adder to be handled in cycle 2. In cycle 2, since the propagates and generates are known for every 4 digit or 2 digit adder block, the group carry equation is equivalent to the equation of a 10 bit or 5 bit binary adder, since there are 10 groups and they are either propagate the whole or half the width of the adder. In option 2, the carry in into the adder is substitute for CinV of block 288, then cycle 2 simplifies to a 9 bit or 4 bit binary adder equation. In option 3, a 6 digit adder could be supported in cycle 1 and then the least significant two function blocks propagate the carry into the adder, and then cycle 2 would simplify to a 8 bit or 3 bit binary adder equation.

FIG. 2 also depicts an example of the processing performed by each of the function blocks. Function block 284 is utilized as an example of this processing and FIG. 2 depicts how the outputs $S_Y(8:11)$ and CinV3 are generated. Four bits of the A and B operand (denoted A2 and B2 respectively) enter each of four separate components (i.e., component 2841, component 2842, component 2843 and component 2844). The sum A2+B2 is calculated in component 2841, A2+B2+1 in component 2842, A2+B2+6 in component 2843 and A2+B2+7 in component 2844. These sums are calculated in parallel with each other. The results of component 2841 and component 2842 are input to a multiplexer 2845. The carry-in to function block 284 (CinV2) is utilized to select between A2+B2 in component 2841 and A2+B2+1 in component 2842. If CinV2 is equal to one then A2+B2+1 in component 2842 is selected by the multiplexer 2845, otherwise, A2+B2 is selected by the multiplexer 2845. Similarly, the results of component 2843 and component 2844 are input to a multiplexer 2846. The carry-in to function block 284 (CinV2) is utilized to select between A2+B2+6 in component 2843 and A2+B2+7 in component 2844. If CinV2 is equal to one then A2+B2+7 in component 2844 is selected by the multiplexer 2846, otherwise, A2+B2+6 is selected by the multiplexer 2846. The output from the multiplexer 2845 and multiplexer 2846 are input to a third multiplexer 2847.

The results of the third multiplexer 2847 differ by six and the selection between the two is a function of the type of operation (binary or decimal) that is being computed in the adder and whether or not there is an overflow associated with the sum selected in the previous multiplexer. Output from the third multiplexer 2847 includes the sum of the two digits, $S_V(8:11)$. Another output is the carry in, CinV2, for input to the functional block 282 to the left of functional block 284. FIG. 2 is a functional diagram to illustrate the concept of the first cycle of the two cycle adder, the functions depicted in FIG. 2 may be combined and may share circuits. In addition, the multiplexing steps can be reordered, flattened into a single step and/or replaced with equivalent combinatorial logic.

Exemplary embodiments of the present invention include a wide adder that calculates a sum in two cycles. This may result in improved performance of the overall computer system because the clock for the computer system will not need to be slowed down in order for the wide adder to have enough time to complete its calculations.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method for implementing a decimal floating point adder, the method comprising:
    receiving a first operand at a first input register;
    receiving a second operand at a second input register;
    calculating a sum of one or more corresponding digits from the first operand and the second operand, the calculating performed by a plurality of adder blocks during a first clock cycle, wherein output from the calculating includes the sum of the corresponding digits and a carry out indicator for the corresponding digits;
    storing the sums of the corresponding digits in an intermediate result register during the first clock cycle;
    storing the carry out indicators in a carry chain during the first clock cycle;
    incrementing each of the sums in the intermediate result register by one during a second clock cycle;
    selecting between each of the sums and the sums incremented by one, wherein input to the selecting includes the carry chain, the selecting occurs during the second clock cycle, and the output from the selecting includes a final sum of the first operand and the second operand; and
    storing the final sum in an output register.

2. The method of claim 1 wherein the plurality of adder blocks includes one or more four digit adders and two digit adders.

3. The method of claim 1 wherein the plurality of adder blocks includes eight four digit adders and two two-digit adders.

4. The method of claim 1 wherein the selecting is performed by a multiplexer.

5. The method of claim 1 wherein the digits are binary coded decimal (BCD).

6. The method of claim 1 wherein the first and second operands are up to one hundred and forty four bits in length.

7. The method of claim 1 wherein each of the carry out indicators includes a carry propagate term and a carry generate term.

* * * * *